(12) United States Patent
Vivier

(10) Patent No.: US 10,603,875 B2
(45) Date of Patent: Mar. 31, 2020

(54) MOTOR VEHICLE GLAZING

(71) Applicant: AGC GLASS EUROPE, Louvain-la-Neuve (BE)

(72) Inventor: Jonathan Vivier, Beuzet (BE)

(73) Assignee: AGC GLASS EUROPE, Louvain-La-Neuve (BE)

( * ) Notice: Subject to any disclaimer, the term of this patent is extended or adjusted under 35 U.S.C. 154(b) by 0 days.

(21) Appl. No.: 15/742,734

(22) PCT Filed: Jul. 1, 2016

(86) PCT No.: PCT/EP2016/065509
§ 371 (c)(1),
(2) Date: Jan. 8, 2018

(87) PCT Pub. No.: WO2017/005627
PCT Pub. Date: Jan. 12, 2017

(65) Prior Publication Data
US 2018/0207909 A1    Jul. 26, 2018

(30) Foreign Application Priority Data

Jul. 8, 2015    (EP) .................................... 15175873

(51) Int. Cl.
*B32B 17/10* (2006.01)
*G06F 3/044* (2006.01)
(Continued)

(52) U.S. Cl.
CPC .. *B32B 17/10036* (2013.01); *B32B 17/10192* (2013.01); *B32B 17/10211* (2013.01);
(Continued)

(58) Field of Classification Search
CPC ........ B32B 17/10036; B32B 17/10541; B32B 17/10229; B32B 17/10293;
(Continued)

(56) References Cited

U.S. PATENT DOCUMENTS 10,310,304 B2 * 6/2019 Linthout ........... B32B 17/10036
2006/0275599 A1   12/2006 Lefevre
(Continued)

FOREIGN PATENT DOCUMENTS

| WO | WO 2004/062908 A2 | 7/2004 |
| WO | WO 2013/189794 A1 | 12/2013 |
| WO | WO 2015/086599 A1 | 6/2015 |

OTHER PUBLICATIONS

International Search Report dated Sep. 5, 2016 in PCT/EP2016/065509 filed Jul. 1, 2016.

*Primary Examiner* — Tuyen Tra
(74) *Attorney, Agent, or Firm* — Oblon, McClelland, Maier & Neustadt, L.L.P.

(57) ABSTRACT

A motor vehicle glazing, including: (i) two sheets of glass, external and internal, each respectively including an external face and an internal face, joined by one or more thermoplastic separator sheets, (ii) at least one electrically powered functional assembly being inserted between the glazing sheets, (iii) a capacitive sensor controlling the power supply of the functional assembly, the sensor also being arranged on a transparent support coated with an equally transparent conductive layer—(consisting of a first area which corresponds to the capacitive electrode and a second area corresponding to the shielding electrode surrounding the first area, the first and second areas being separated by a distance A), and (iv) a capacitive switch placed at a distance B from the capacitive electrode, where the distances A and B are equal.

20 Claims, 3 Drawing Sheets

(51) Int. Cl.
*B60Q 3/82* (2017.01)
*B60Q 3/208* (2017.01)
*B60Q 3/74* (2017.01)
*B60Q 3/76* (2017.01)

(52) U.S. Cl.
CPC .. *B32B 17/10229* (2013.01); *B32B 17/10293* (2013.01); *B32B 17/10504* (2013.01); *B32B 17/10532* (2013.01); *B32B 17/10541* (2013.01); *G06F 3/044* (2013.01); *B60Q 3/208* (2017.02); *B60Q 3/745* (2017.02); *B60Q 3/76* (2017.02); *B60Q 3/82* (2017.02)

(58) Field of Classification Search
CPC ......... B32B 17/10192; B32B 17/10211; B32B 17/10532; B32B 17/10504; G06F 3/044; B60Q 3/745; B60Q 3/208; B60Q 3/76; B60Q 3/82; G02F 1/13306
USPC .......................... 359/265–275, 900; 345/105
See application file for complete search history.

(56) References Cited

U.S. PATENT DOCUMENTS

2010/0179725 A1   7/2010   Boote et al.
2015/0151675 A1   6/2015   Lefevre et al.

\* cited by examiner

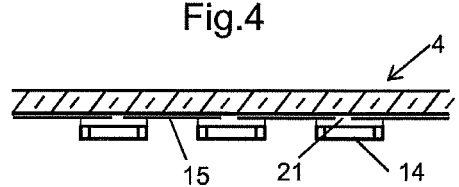
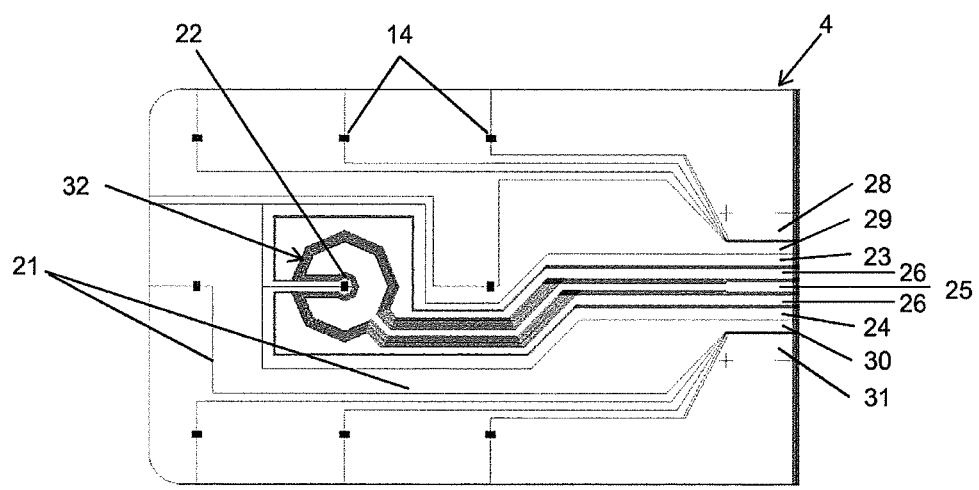

MOTOR VEHICLE GLAZING

The invention relates to laminated motor vehicle glazings into which electrically supplied functional assemblies are inserted, and to the controls of these assemblies.

The functional assemblies incorporated in motor vehicle glazings can, for example, include lighting means. They can also include means controlling variations in optical properties, or heating means, and the like. The publication WO 2004/062908 of the applicant company thus provides the displaying of information by luminescent diodes incorporated in a glazing, in particular a windshield.

Subsequently, the description of the invention is expanded in particular as regards the means for controlling these functional assemblies of the type of lighting and film for modifying the light transmission. Likewise, the description of the invention is associated in particular with the glazings participating in the composition of motor vehicle roofs without ruling out other applications.

The incorporation in the glazed roof of functional assemblies which have to be electrically supplied requires having available controls for these supplies. These controls, of switch or dimmer type, can be positioned on the dashboard, the central console or the door fittings, so that they are easily accessible. For the controls of the means for lighting the passenger compartment, they are generally grouped together in the adjoining part of the roof close to the lighting means themselves.

For esthetic reasons but also for convenience in the locality and also for simplicity of use, provision has been made to see to it that means incorporated in glazings are controlled directly from the glazing itself. This is in particular the case of the abovementioned publication which envisages, in brief, the use of capacitive switches. In this publication, the conductive layers used are applied to the sheets of the glazing itself. It concerns using layers which have a main function, for example, in the windshield case, layers acting as infrared filter.

The electrical supplying of functional elements included in a glazing from a conductive layer covering the whole of a glazing is only a specific case and cannot be generalized. In some cases, such an arrangement is even contrary to the use of these assemblies. In order to see to it that the control of the functional assemblies applies virtually to all the arrangements, in particular those comprising, in one and the same glazing, one or more electrically supplied functional assemblies, the invention provides for the use of means for controlling these assemblies from sensors placed in the glazing on a support other than the glass sheets composing the glazing. The sensors used for these controls are of capacitive type and are formed in conductive layers applied to this support. The sensor is combined with an assembly for processing the signals received from the sensor in question.

The support and the conductive elements forming the sensor are inserted into the glazing between the glass sheets. They are of essentially transparent materials in order not to significantly disrupt the visual appearance of the glazing. Preferably, the support and the sensor, formed in conductive layers applied to this support, are chosen so that they exhibit a predetermined light transmission according to the standard EN 410 which is not less than 80% and preferably not less than 85%.

The introduction of the control means formed in the form of a capacitive switch on a support makes it possible to restrict the dimensions to what is necessary and which concerns only a small portion of the surface area of the glazing. This constitutes a certain advantage in the assembling of the various constituents of the glazing. Another advantage is optionally in the possibility of choosing in the most appropriate way the characteristics other than dimensional which are specific to the support and to the sensor, in particular the materials from which they are formed. The restricted dimensions have additionally the advantage of facilitating the choice of the location of these elements in the glazing. The restricted dimensions render their presence in the glazing more unobtrusive, insofar as, even essentially transparent, they are accompanied by a local modification to the optical aspects which is as modest as this modification.

The supports used for the capacitive sensors have to be easily inserted into the glazing. They preferably have as low a thickness as allows them to function. If the support comprises only the sensor, a flexible film, for example of PET, coated with the conductive layers can be used. In this case, the thickness can be particularly low, of a few hundreds of a millimeter. For supports comprising other functional means, a degree of stiffness may be preferred. In this case, in addition to the supports made of organic material, glass slides with a thickness of a few tenths of a millimeter are advantageously used.

Thus, the invention provides a motor vehicle glazing comprising:
  two external and internal glass sheets, each respectively comprising an external face 101 and 103 and an internal face 102 and 104, joined by means of one or more thermoplastic interlayer sheets,
  at least one electrically supplied functional assembly being inserted between the sheets of the glazing,
  a capacitive sensor controlling the supplying of the functional assembly via a unit for processing the signals emitted by the sensor, the sensor also being positioned on a transparent support coated with a conductive layer which is also transparent, in which layer the sensor is formed of a first region which corresponds to the capacitive electrode and a second region corresponding to the shielding electrode surrounding the first region, the first (capacitive-e) and the second (shielding) regions are separated by a distance A,
  the touch surface accessible by the user is in position 104. This surface is juxtaposed with the surface composing the capacitive sensor. The distance separating these two surfaces is defined by the distance B.

According to the invention, the distance A between the capacitive electrode and the shielding electrode is equivalent to the distance B between the touch surface and the capacitive sensor.

According to one embodiment of the invention, the sensitivity of the capacitive region (touch region) is improved. The electric field will be further disrupted if this condition is observed, thus improving the signal to noise ratio. This design thus allows us to achieve a Signal/Noise ratio of greater than 5.

The control means according to the invention also advantageously offer compositions which guarantee an improved functioning in terms of sensitivity and of reliability in an environment which may develop significant unwanted signals. The combination of different functional assemblies in one and the same glazing, all electrically supplied, inevitably generates fields which can interfere with the functioning of the capacitive sensor. In order to exclude or at least minimize these unwanted influences, the capacitive sensor is advantageously constructed so as to carry out an increased discrimination of the signals emitted by the sensor. To this end, the sensor comprises an assembly of an electrode and a shielding area surrounding the electrode situated close to one another. The functioning of this assembly is described in detail in the continuation of the description. Shielding is understood to mean a neutral region, that is to say a region whose electric potential is neutral, unchanging with variations in the capacitive region. Should possible unwanted signals appear over this shielding region, the electronics will take this noise into account in order to process the signal from the capacitive electrode.

In order to prevent the installation of multiple elements, in particular conductors connecting the sensor to a processing unit situated outside the glazing, from complicating the structure and the assembling of the glazing, these conductors are advantageously formed in the same layer as that of the electrodes and, for this reason, also offer the same transparency. Optionally, other conductors may also be used, in particular wires having a very small diameter and being as a result not very discernible. However, for the reasons indicated, preference falls on the conductors formed in the conductive layer.

As emphasized above, the support of the sensor is advantageously of restricted dimensions in comparison with those of the glazing. The electrodes of the sensor itself have dimensions according to the embodiment. The latter consists, for the operator, in moving the hand or even a finger as close as possible, as for a mechanical switch. In the case of the capacitive sensor, the modification to the field at the approach of the electrodes is sufficient to change the characteristics of their capacity. The modifications introduced depend on the configuration of the sensor and in particular on its dimensions. The electrodes on their support preferably cover only a surface area which is not greater than $0.1$ dm$^2$ and preferably not greater than $0.05$ dm$^2$. These dimensions result in restricted variations in capacity. The corresponding method of processing the signals consequently has to take into account these small-scale modifications. In particular, it is necessary to choose a processing which makes it possible to abstract everything which may detrimentally affect the satisfactory functioning of the sensor.

Unwanted modifications may originate from elements external to the glazing, in particular from the various electronic assemblies present in the vehicle. They may also originate from the glazing itself, or also from the structure of the sensor itself or the elements which are associated with it. Insofar as the conductors are also sensitive to modifications to the electric field, in the form comprising two electrodes, vigorous attempts are made to separate the conductors from one another in order for the modifications to their capacity not to interfere with the measurement. The setting of satisfactory thresholds for the signal takes into account these possible unwanted signals.

According to the invention, the capacitive region and the shielding region are separated from one another by an insulation region, the dimensions of which depend on the "assemblage used" (as a result of the condition distance A=distance B). There are, between the capacitive electrode and the touch region, 1 glass of 2.1 mm and 1 PVB interlayer of 1.9 mm (3 PVB layers of 0.76 mm compressed=~1.9 mm). According to a specific use of the invention, the insulation region between the capacitive region and the shielding region is formed by a series of laser lines spaced out from one another by a distance allowing good insulation, the laser lines being parallel to one another. This interdistance between lines has to be carefully chosen in order to optimize the electrical insulation performance qualities with regard to the esthetics. Each laser line has a defined insulation which is greater than 100 Mohm and a width which does not exceed 100 micrometres. Apart from the fact of using the system described above in accordance with the invention, the frequency of determination of the modifications in capacity of the electrodes makes it possible to add to the discrimination between signals. Preferably, several signals consecutive in time are chosen for the recognition of a modification desired by the operator. The possible unwanted signals of high frequency related to other components close to the sensor are thus excluded. Conversely, the triggering is thus preferably effective when the triggering threshold is established over time, in keeping with the mode of intervention of the operator. Frequencies of the order of from a few Hertz to a few tens of Hertz are highly suitable for the use of the invention. For example from 1 Hz to 100 Hz and preferably from 10 Hz to 50 Hz.

Furthermore, it is advantageous to see to it that the determination of capacity is not carried out completely uniformly over time. This determination is preferably carried out according to the form designated under the name of "Pseudo Random Sequence" (PRS). This makes it possible to exclude possible "resonance" between unwanted signals and those actually controlling the switch.

The modification to the electric field can originate from both sides of the glazing. Insofar as the triggering should only occur on one side, it is advisable to interpose a conductive element acting as shield to these undesired field modifications. As the influence on the electric field is not restricted to the presence of an element strictly facing the sensor, it is preferable for the shield to extend beyond this surface. In practice, as the examples give instances of later, the constituents of the glazing often result in the presence of shields having another function, and these shields extend over much greater surface areas than that of the sensors. These shields are themselves also essentially transparent. They are composed of systems of well-known thin conductive layers, either comprising one or more metal layers, or they are layers of conductive oxides of TCO (thin conductive oxides) type.

Furthermore, it may be desired for the modification to the electric field to be detected only over a very precise locality in front of the sensor. A shield comprising a window may then be positioned on the same side from where the modification has to originate. The size of the window would thus define the size of the touch region accessible by the user. Such a shield may in particular assume the form of a conductive layer positioned on the glass sheet directed toward the interior of the passenger compartment.

Protection against unwanted influences can advantageously be improved by having available, at the periphery of the conductive layer in which the sensor is formed, a region separate from the sensor and connected to earth.

The incorporation in the glazing of the sensor, as indicated above, is preferably as unobtrusive as possible, which is obtained by using a support and conductive layers which are essentially transparent. These provisions, the aim of which is to keep the optical qualities of the glazing as uniform as possible, have as counterpart a more difficult perception of its locality for the user. Various means are capable of making it easier to locate the sensor. While the site of the sensor may be indicated by a marking on the glazing (application of an enameled pattern, localized frosting, and the like), it is preferred, still in order to retain as much as possible the surface state of the glazing, to indicate the site by the presence of a diode. This low-power diode is advantageously carried by the support of the sensor and is supplied by conductors formed in the layer in which the sensor is itself formed.

The methods relating to the employment of this means of locating the sensor, in particular the fixing of the diode and its supplying, are analogous to those described on the subject of the lighting diodes constituting one of the specific functional means envisaged according to the invention, as described below.

As indicated above, the lighting means appear among the functional elements inserted into the glazing according to the invention. These means, necessarily of small dimensions, are composed of light-emitting diodes. These diodes can be used for ambient lighting and are then advantageously distributed over the surface of the glazing. They can also constitute more localized lighting elements, such as those constituting "reading lights". In this case, a concentrated light beam results in several diodes being gathered together over a restricted surface area.

According to a preferred embodiment of the invention, for these reading lights, the diodes are introduced into the glazing on the support which comprises the sensor for controlling these diodes, and these diodes are supplied by conductors formed in the conductive layer used to form the sensor.

The combination on one and the same support of the supplying of diodes and of the capacitive control is in principle advantageous insofar as the multiplicity of the elements incorporated in the laminate is avoided and that it is for this reason possible to minimize the total thickness of the glazing. However, this can only be obtained at the price of specific arrangements relating to the support itself and the properties of the conductive layers.

The support of the diodes has to be dimensionally stable for the convenience of assembling. Films of poly-terephthalate (PET) type can be used as support but, due to their great flexibility, they can be difficult to keep completely flat during the assembling of the laminated glazing. For this reason, the use of a support of reduced flexibility is preferred. Nevertheless, the support has to be sufficiently flexible to be able to be inserted in a glazing which, in practice, is always more or less curved.

The use of very thin glass sheets simultaneously exhibits a convenience of bending but also a stiffness which facilitates the installation. For the glass supports, a tempered sheet is preferably used. The thickness is preferably less than 0.8 mm and more advantageously still the thickness is less than 0.5 mm, indeed even less than 0.4 mm. Even much lower thicknesses are also possible. The lower limit of this thickness is mainly controlled by the ability of the sheet to withstand the attaching of the diodes and furthermore the strains experienced in the assembling of the different constituents of the glazing, which assembling is carried out under pressure and at a temperature of the order of 130° C. In this operation, the insertion of the diodes in the thermoplastic interlayer materials, even if these materials are softened by the rise in temperature, stresses the support of the diodes.

The transparent electrical conductive products used according to the invention to form the sensor are well known in the glass field. They are formed of sufficiently thin layers of conductive oxides or of metal layers, the latter positioned in assemblies of protective dielectric layers.

While the metal layers generally offer a better conductivity than the layers of conductive oxides, the attaching of the diodes to these layers presents problems of implementation and of reliability. First, these layers, even included in an assembly of dielectric layers which are intended to protect them, usually remain very brittle. The handling operations can result in scratches leading to the breaking of the continuity of the layer or to short circuits between conductors delimited in the same conductive layer. The presence of the dielectric layers covering the metal layers also requires the difficult withdrawal of these surface protective layers in order to ensure good contact during the attaching of the diodes. Should this exact removal not be carried out, the risk of defect in electrical continuity renders the operation uncertain. For these reasons, the preferred layers are formed of conductive oxides, which exhibit a certain hardness and do not comprise protective layers which increase the risks of defects during the attaching of the diodes.

The characteristics of the layers of conductive oxides and in particular their electrical resistance depend greatly on their composition but also on the conditions under which these layers are produced. The most economical technique consists of a deposition by gas pyrolysis (CVD), carrying out the deposition on the glass sheet during its inline formation. However, this method is feasible only on sheets, the thickness of which is not compatible (a minimum of approximately 3 mm) with the usage provided by the invention. Consequently, the preparation of these layers used is carried out by "uptake" on sheets of limited thickness. The commonest technique is a vacuum cathode sputtering technique.

The formation by cathode sputtering makes it possible in particular to deposit metal layers. However, as indicated above, these layers are not very strong mechanically and consequently layers of oxides are generally preferred to them. Layers based on indium oxide doped with tin oxide (ITO) appear in particular among the most conductive layers of oxides. These layers, under thicknesses corresponding to the condition of transparency, make it possible to achieve resistances of less than 50Ω/□ and preferably of less than 30Ω/□ and in particular of less than 20Ω/□ and more particularly of less than 10Ω/□.

The electrical resistance of the layers is necessarily a function of their thickness. An increase in the thickness makes it possible to reduce the resistance but comes up against the need to retain a good transparency. For the layers of ITO type, an acceptable level of absorption corresponds to layers, the thickness of which does not exceed 300 nm and preferably 200 nm.

The appropriate supplying of the diodes requires a minimum of power which goes through an appropriate electrical intensity, it being understood that the voltage available on the specific vehicles is traditionally limited. The voltages applied are normally of the order of 14 V. Under this voltage, the supplying of diodes forming a reading lights is, for example, of the order of 20 to 40 mA. The power for the supplying of the diodes is also accompanied by a portion dissipated by the Joule effect in the layer. It is desirable for the latter to be as low as possible, in particular in order to limit the heating which is additional to that from the diodes.

Whatever the power necessary for the supplying of the diodes, it is preferable to limit the surface area necessary for the formation of the electrical network which supplies them. This limitation facilitates the insertion into the glazing and minimizes the lack of homogeneity introduced into the appearance of the glazing as a result of this insertion. This limitation, in the case of lighting of "reading light" type, is also controlled by the need to group together the group of the diodes forming the light source over a restricted space.

The presence, in addition to the diodes, of other electrically connected elements and in particular the presence of the sensor for the control of a capacitive switch of these diodes results in the development, on the same support, of a circuit in which the conductors are tightly interwoven. The circuit is preferably obtained from a uniform conductive layer in which the conductors are rendered separate by the ablation of the layer along separation lines for the different conductive elements. This ablation is advantageously carried out using a laser beam due to the accuracy which this method makes it possible to achieve, in comparison in particular with mechanical methods.

The accuracy of the separation of the different conductors positioned on the same support obtained by this ablation method means that the separation lines can be very thin without risk of subsequent short-circuits. The thinness of these separation lines also contributes to the apparent optical homogeneity of this support. In practice, separation lines can be of the order of a few tens of microns, in particular 100 µm or less, in particular of the order of 50 µm. If appropriate, a double line can replace the single line for the convenience of the ablation operation carried out increasingly rapidly as the ablation line becomes narrower.

The choice of the width of the separation lines has to guarantee an insulation of at least 10 MΩ and preferably of at least 100 MΩ.

The glazings of roofs also advantageously comprise electrically supplied functional assemblies which make it possible to vary the light transmission, such as electrochromic films, SPD (suspended particles device) films or liquid crystal (LC) films. These assemblies are also advantageously controlled by capacitive sensors included in the glazing according to the invention. Normally, these films are introduced into the glazing independently of the support of the sensor which is used to control them.

Generally, the films in question comprise conductive elements which extend over their entire surface area. These conductors thus constitute shields for the capacitive sensors present in the glazing. This sets the order in which these elements are located with respect to one another in the thickness of the glazing when they are superimposed. When, in these films, one of the conductive elements is connected to earth, it is preferred to choose the one which is the closest to the capacitive sensor in order to prevent unwanted influences of the supplying of the film.

These films which modify the light transmission are furthermore sensitive to the temperature. Systems of infrared-reflecting layers are used to protect them. These systems which are the most effective comprise thin metal layers which also form a shield with respect to the electric field modifications originating from the exterior of the vehicle.

Generally, in the preparation of the glazings according to the invention, it is advisable to consider the abilities of the constituent elements to withstand the treatments which result in the shaping and in the assembling of the glazing. The roofs of the vehicles exhibit curvatures which are relatively unaccentuated with the exception possibly of those of the edges of these glazings. All the constituents included in these glazings have to be able to withstand these curvatures, hence the need to use supports for the sensors which are sufficiently flexible. Furthermore, when the supports according to the invention exhibit a not insignificant thickness (this is the case for the supports consisting of a glass sheet), it is preferable, in order to facilitate the assembling, to set out these supports in a corresponding housing made in an interlayer sheet of analogous thickness, thus constituting a type of frame for the support.

The invention is described in detail subsequently with reference to the examples illustrated by the plates of drawings, in which:

FIG. 1 exhibits, in exploded perspective, elements of a glazing according to the invention, the functional assembly of which consists of a localized lighting insert;

FIG. 3 shows a drawing of a circuit for supplying the diodes and electrodes of the associated capacitive sensor;

FIG. 4 is a diagrammatic representation in section of supplying of lighting diodes;

Figure 1:
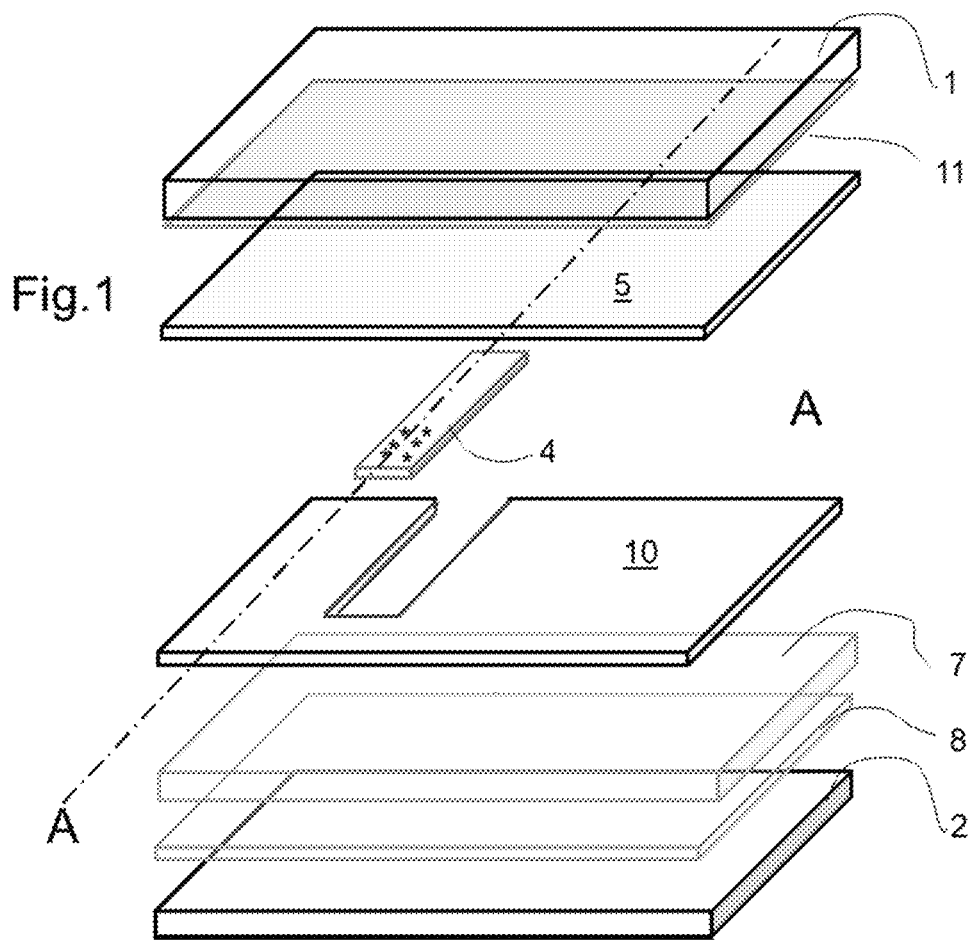
Figure 2:
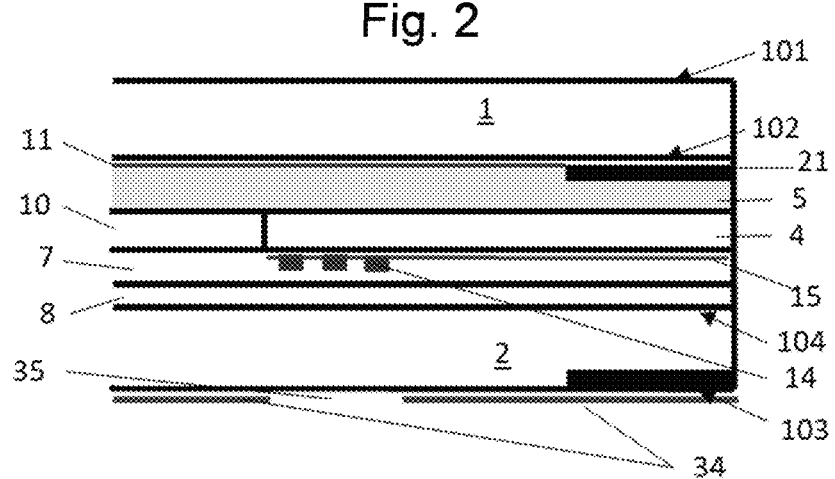
FIG. 2 is one in section along the A-A axis of FIG. 1, once the constituent elements are assembled.
Figure 5:
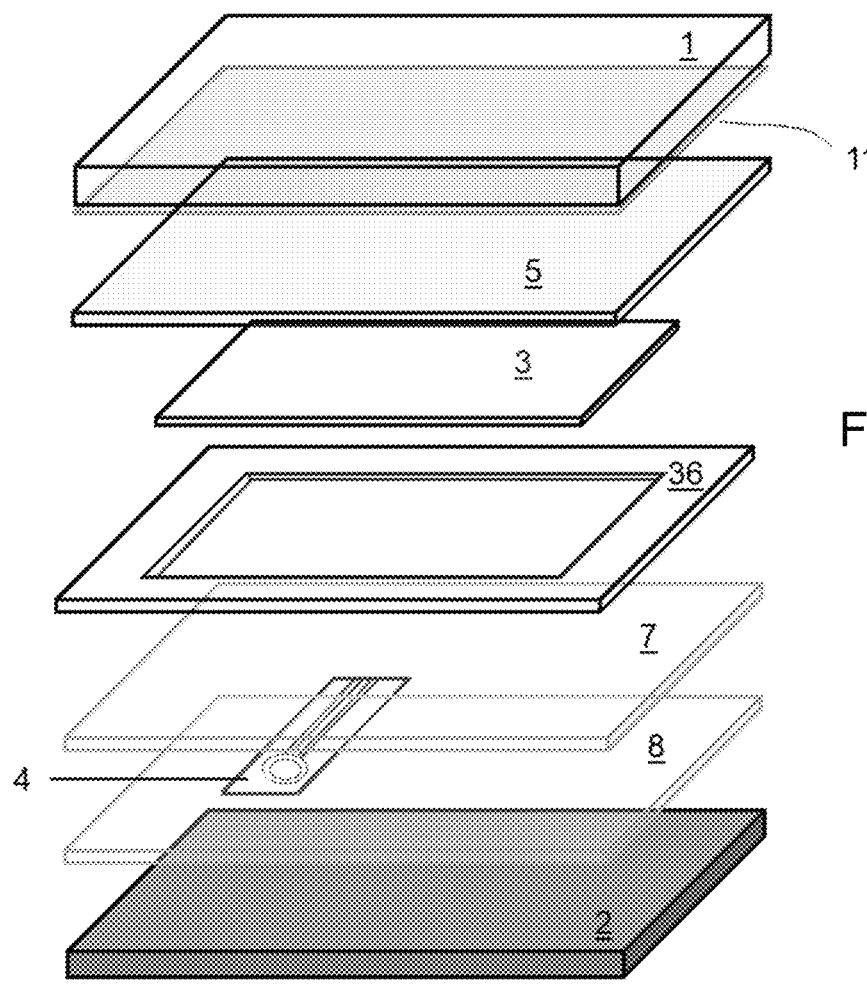
Figure 6:
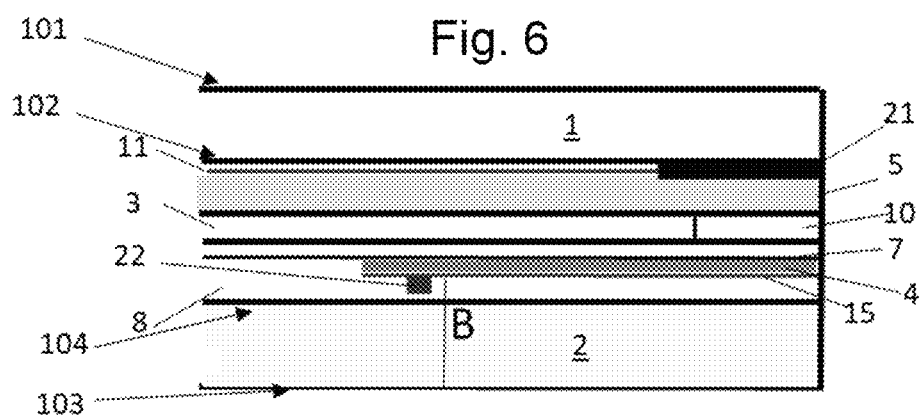

FIG. 5, which is analogous to FIG. 1, represents a glazing comprising, as functional assembly, a film controlling the light transmission;

FIG. 6 is analogous to FIG. 2 and diagrammatically represents the glazing after assembling the constituent elements.

FIG. 1 does not show the curvatures of the sheets, for the sake of clarity. In practice, roofs, whether or not they are glazed, exhibit curvatures which are ordinarily more accentuated at the edges in the place where they join with the body for a fit chosen for its design, the aerodynamics and the flush appearance corresponding to a good surface continuity between the contiguous elements.

The glazing comprises two glass sheets 1 and 2. The sheets presented are of clear glass but they may be tinted, possibly very strongly, at least for one of them, when, as regards a motor vehicle roof, it is advisable to reduce the light and energy transmissions. Conventional interlayer sheets 5, 7, 8 and 10 provide the assembling of the glazing. The sheet 5 is represented as highly colored. The purpose of such a sheet is, for example, like the glass sheets, to regulate the light and energy transmissions.

The glazing comprises a support 4. In order to facilitate the insertion of this support, for example consisting of a glass sheet with a thickness of 0.4 mm, the interlayer sheet 10 comprises a housing, the dimensions and the thickness of which are those of the support.

The insertion of the supports is favorably carried out starting from the edges of these glazings. In other words, the supports in question are positioned in the portions of the glazing comprising the most accentuated curvatures. For this reason, the supports in question 4 necessarily have to exhibit a degree of flexibility in order to follow the curvatures which are imposed on it in the assembling.

In practice, the curvature of the glazing is that which is imposed by the glass sheets 1 and 2. Most commonly, the two glass sheets have a curvature which is as close as possible for an assembling which does not introduce stresses into these sheets.

In FIG. 1, the glass sheets are presented without the enamel patterns which are conventionally used to mask the edges of the glazings. Enamels of this type are, for example, positioned on the internal face of the sheet 1, thus in position 102, concealing all of the adhesive joints and connections located at the edge of the glazing. The masking enamels may also be in position 104, in other words on the face of the glazing exposed to the interior of the passenger compartment. However, in this position, for observation from the exterior of the vehicle, they do not mask the elements included in the laminate. It is also possible to position the maskings in position 102 and in position 104.

4 very diagrammatically represents that which corresponds to the support of the sensor and, in the case of this figure, the support is also that of the functional assembly formed by diodes 14. This element 4 is combined with a transparent conductive layer 15 represented in FIG. 2. This layer is advantageously composed of conductive oxide, for example of ITO.

In the form represented in FIGS. 1 and 2, an assembly of thin layers 11, of antisolar type, is applied to the glass sheet 1. These layers constitute a selective filter for infrared radiation. These filters are widely used in the field of glass. They are generally composed of metal layers sufficiently thin to be virtually transparent. In these filters, the metal layers are combined with dielectric layers, also thin and transparent, which give the assembly the desired selectivity. Most often, in order to improve this selectivity, which is accompanied by reflection that should be made as neutral as possible, the filters comprise a plurality of metal layers which are conventionally based on silver.

The layers filtering the infrared radiation are either applied to the external glass sheet 1, as illustrated in FIGS. 1 and 2, or are introduced via an interlayer polymer sheet, in particular of the PET type, on which the layers are deposited beforehand. The use of a support film makes it possible not to subject the fragile layers to high temperatures corresponding to the stage of bending glass sheets, the introduction of these layers with the PET film occurring only for the assembling in the oven.

The choice of the system of layers is advantageously that of systems having several silver layers, in order to obtain an effective filter, and which makes possible control of the coloring, in particular in reflection. A particularly effective assembly of layers is as described in the application WO 2011/147875. In this application, the recommended system comprises three silver layers and dielectric layers, the assembly being chosen, in particular the thicknesses of the silver layers, so that the coloring in reflection is satisfactory even at low incidences of observation.

The presence of these conductive metal layers constitutes an electromagnetic shield which protects the capacitive sensors of the glazing from external effects. This protection can also result from any conductive element positioned above the sensors. Such elements are either introduced with this sole aim or, preferably, correspond to additional functional means comprising conductive layers. They can in particular be heating layers. They can also, for example, be films which modify the optical properties by application of an electric field, such as "SPD" (suspended particles devices) films, liquid crystal (LC) films or electrochromic films. Such assemblies form the subject of a description in connection with FIGS. 5 and 6.

FIG. 2 diagrammatically exhibits a glazing comprising the elements of FIG. 1 after its various constituents have been assembled. The relative dimensions are not observed in order to make things easier to understand.

Enamel bands 21 are represented on the edge of the glazing. These enamel bands are applied by screen-printing techniques to the glass sheets covered beforehand with the layers 11. The enamel bands are positioned so that they cover and mask the ends of the support 4, which ends are the site of the elements which make possible the connection of the different electrical circuits of the support 4 with the means for processing the electrodes of the sensor and for supplying the diodes, these means not being represented. As represented in FIG. 2, the enamel bands can be applied to each of the glass sheets in order to act as mask both on viewing from the exterior and from the interior.

The adjustment of the interlayer sheet 10 and of the support 4 does not take into account the excess thickness corresponding to the diodes 14. The latter have very small dimensions. Their insertion is obtained simply by the softening of the interlayer sheets 7 and 8 which face them, and by the pressure exerted during the assembling.

In the form presented, two interlayer sheets 7, 8 are employed. It is a matter here of seeing to it that the total thickness of the two sheets is at least equal to and preferably slightly greater than that of the diodes, in order to facilitate their insertion into this material. The conventional interlayer sheets are sold in a standard thickness in particular of 0.76 mm and 0.38 mm in thickness. The combination presented corresponds, for example, to a total thickness of 0.76+0.38, i.e. 1.14 mm, for diodes for which the height on the support 4 can be approximately 0.8 mm.

A mechanism is capable of detrimentally affecting the optical quality of the glazing. As described in detail in the application WO2009/050195, the interlayer materials of PVB type which include ions, in particular alkali metal ions, may assume a brown tint on contact with electrically conductive circuits based on oxides. Furthermore, this detrimental change may be accompanied by a modification to the conductivity of the layers in question. The publication mentioned establishes that these detrimental changes result from the presence of a certain content of residual monovalent ions, in particular alkali metal ions, present. In order to avoid these disadvantages, the use of interlayer sheets including ions of greater dimensions, and which are thus less mobile, is provided.

For this reason, it is preferred to use an interlayer sheet 7 in contact with the conductive layer 15 supplying the diodes 14, of a material corresponding to these characteristics. By way of indication, such a material is that sold under the name of TROSIFOL Solar by Kuraray.

In addition to the elements present in FIG. 1, an additional layer 34 may be applied to the glass sheet 2 directed toward the interior, which layer constitutes a shield to the field modifications which are not located at the site of the capacitive sensor. For this, the layer as represented is interrupted at this site at 35. It is understood that the layer may be completely interrupted, for example by total ablation of a portion of the layer, as shown in FIG. 2, or, advantageously, the layer may be partially interrupted, so as to electrically and physically isolate a region of the layer at the site 35 with respect to the remainder of the layer 34. Thus, a circle delimiting this region may be drawn using a laser. The laser line of this circle will advantageously be more unobtrusive than the total ablation of the layer as this laser line exhibits a width of 100 µm. As above, this layer is conductive and is advantageously connected to earth and is transparent. If this layer is on the face of the sheet 2 directed toward the passenger compartment, it is advantageously chosen to be sufficiently hard. Such a layer is, for example, of doped tin oxide.

Advantageously, the layer 34 is a (or several) low-e layer(s) in order to minimize the loss of heat, low-e layers can be applied to the face of the sheet 2 directed toward the passenger compartment. In the conventional designation of the faces of laminated glazings, it concerns position 104. The layers in question act as a filter which selectively reflects the far infrared rays emitted from the passenger compartment, without forming a significant obstacle to the transmission of the rays of the visible region from the exterior toward the interior.

The presence of thin layers in position 104 is chosen despite the fact that, in this position, the layers are not protected from detrimental changes, in particular detrimental mechanical changes. It is possible to choose low-e layers which offer a sufficient mechanical strength and chemical resistance.

Advantageously, in view of the importance of having available coatings of good mechanical strength, "hard"

layers, such as those produced by techniques of pyrolytic, CVD or PECVD type, are chosen. However, low-e systems can also be prepared by vacuum cathode sputtering techniques, provided that these systems are protected by layers which are sufficiently resistant.

According to the invention, it is preferred to use a system of low-e layers, the emissivity of which is less than 0.3 and preferably less than 0.2 and particularly preferably less than 0.1.

The commonest pyrolytic low-e systems comprise a layer of doped tin oxide deposited on a first layer having the role of neutralizing the color in reflection. The layer in contact with the glass is ordinarily a layer of silica or silicon oxycarbide, optionally modified by additives. Tin oxide layers, compared with the layers of the systems deposited by cathode sputtering, are relatively thick, more than 200 nm and for some more than 450 nm in thickness. These thick layers are sufficiently resistant to withstand exposure to mechanical and/or chemical ordeals.

According to a specific embodiment of the invention, the capacitive sensor (touch region) is placed in position 104 and the lighting insert comprising the diodes is placed between the two glass sheets.

According to the invention, the lighting insert comprises both the light-emitting diodes and the capacitive sensor and is placed in position 104 of the motor vehicle glazing.

FIG. 3 diagrammatically illustrates the arrangement of the diodes 14 on the support 4 formed by the glass slide. In the present case, the glass slide with a thickness of 0.40 mm is coated with an ITO conductive layer 15.

The conductive layer 15 is cut so as to form the circuit for supplying the diodes 14. The diodes are adhesively bonded to this layer. They are gathered together over a restricted surface area in order to result in a concentrated beam of sufficient light power. The conductive circuit is formed so as to separate the supply poles, each diode being adhesively bonded to each of the two poles.

A diagrammatic circuit is, for example, presented in FIG. 3. The slide 4, seen from above, comprises a conductive layer which is applied over most of the slide. The layer is divided by lines for ablation of the conductive layer, such as those referenced 21, in order to form the circuit for supplying the diodes 14. The layer is made of two parts covering a wide surface area in order to limit, as much as possible, the heat produced in this layer by the Joule effect. The dimensions of the surfaces of these conductors are also predetermined so as to guarantee a virtually identical supply current for each of the diodes 14. The latter are grouped into two series of four diodes, each positioned symmetrically. The diodes of a series are supplied in "series" along these conductors, the ends of which, respectively 28, 29 and 30 31, correspond to the two supply poles (+, −).

In order to form the circuit, the layer 15 initially extends uniformly over the entire surface of the glass sheet 4, with optionally uncoated edges. The separation of the various regions in this layer is obtained along lines 21 marked out in this layer, for example by ablation using a laser by known prior methods. The width of the ablation is limited to the width necessary to guarantee that the zones are electrically well isolated from one another. FIG. 4 diagrammatically illustrates the arrangement of the diodes 14 with respect to the ablation lines of type 21 of the conductive layer 15.

The diodes are distributed so as to spread out as best as possible the heat produced during functioning.

By way of example, the conductive layer is an ITO (indium tin oxide) layer with a thickness of 150 nm and a resistance of 10Ω/□. The ITO layer is advantageous, in particular because of its color neutrality and its transparency. It does not substantially modify the appearance, in particular in transmission, in contrast to the layers based on doped tin.

The supplying of the diodes is under a voltage of 22 V, for example of 25 mA.

FIG. 3 also exhibits a sensor 32 comprising two electrodes, the capacitive electrode and the shielding electrode. The diameter of the capacitive electrode is approximately 27 mm for a width of the slide 4 of approximately 12 cm.

The electrodes and their conductors are also produced in the cut conductive layer like the circuit for supplying the diodes. The conductors 25, 26 are connected to a processing assembly controlling the switch of the diodes 14. The method of functioning is that described above. The frequency of analysis of the charge of the electrodes is set at 33 Hz. The movement of the operator close to the sensor 32 triggers the switch of the diodes. If appropriate, the circuit in a known way may also comprise a dimmer resulting in different levels of supplying for lighting of varied intensity, each pulse or the length of the pulse changing from one level to another.

Appropriate thresholding of the signal originating from the touch region will make it possible to distinguish pressure on the touch region 32 or on the conduction region 25.

The glass slide 4 in the example presented also comprises a diode 22, the role of which is to indicate the site of the control electrode. This diode has a very low power in comparison with that of the diodes 14 of the reading light. The diode 22 is supplied by conductors 23, 24 cut out in the conductive layer 15.

FIG. 5, analogous to FIG. 1, shows the components of a glazing comprising another functional assembly. The same references denote the same elements.

The functional assembly consists in this instance of a film 3 controlling the light transmission. The film 3 is of electrically controlled type. It is, as indicated above, for example, liquid crystal film, SPD or electrochromic. For the incorporation and the protection of the film 3, it is advantageous to position it in a frame 36 consisting of an interlayer sheet. All these films have in common the fact of positioning the reactive material between two conductive layers which cover both faces. These conductive elements constitute shields for the capacitive sensor positioned on the support 4 so that the triggering can only be carried out on the side opposite these shields. For a motor vehicle roof, this side is that directed toward the interior of the vehicle, in other words under the glass sheet 2. Furthermore, the functional assemblies shown are normally protected from infrared radiation by the filter ii, which adds to this function of shield.

In the form represented in FIGS. 5 and 6, the support 4 exhibits a sensor made in a conductive layer 15 and optionally a positioning diode 22.

The support 4, in particular if it does not comprise a diode 22, is advantageously very thin. A simple PET film with a thickness of a few hundredths of a millimeter may be sufficient. These films coated with conductive layers, in particular comprising a system of layers comprising layers of silver metal, are commercially available. The advantage of the use of these films is that they can be inserted into the laminate without specific precautions relating to their thickness. If appropriate, the presence of the diode 22 does not preclude the use of such a support. Nevertheless, it is advisable in this case to retain one or more interlayer sheets, one role of which is to be able to receive this diode 22.

The examples of FIGS. 1 and 2, on the one hand, and 5 and 6, on the other hand, obviously have the aim only of illustrating the invention, which can assume multiple configurations. The functional assemblies are in particular those for which the examples are shown, but other assemblies can also be controlled, in particular heating layers included in the glazing. Furthermore, as indicated, the glazings under consideration can include several functional assemblies. This is the case, for example, of a glazing simultaneously comprising lighting means and films controlling the light transmission, each separately comprising sensors constituting the respective switches.

The invention claimed is:

1. A motor vehicle glazing comprising:
an external glass sheet and an internal glass sheet, each respectively comprising an external face and an internal face, joined by one or more thermoplastic interlayer sheets,
at least one electrically supplied functional assembly being inserted between the one or more thermoplastic interlayer sheets,
a capacitive sensor for controlling the supplying of the functional assembly via a unit for processing signals emitted by the sensor, the sensor also being positioned on a transparent support coated with a transparent conductive layer, the sensor being formed, in the transparent conductive layer, of a first region which corresponds to a capacitive electrode and a second region corresponding to a shielding electrode surrounding the first region, the first and the second regions separated by a distance A,
a capacitive switch placed at a distance B from the capacitive electrode, wherein a distance A between the capacitive electrode and the shielding electrode is equivalent to the distance B between the capacitive switch and the capacitive electrode.

2. The glazing as claimed in claim 1, wherein the signals emanating from the capacitive and shielding electrodes are analysed by the processing unit.

3. A process for controlling a glazing as claimed in claim 2 wherein each electrode alternatively, according to a given frequency, is the subject of a determination of capacity, a variation in measured capacity constituting a signal determining control of the switch beyond a chosen threshold making it possible to distinguish pressure on a conduction channel.

4. The process as claimed in claim 3, wherein a frequency of determination of the capacities is at least from 1 to 100 Hz.

5. The process as claimed in claim 3 wherein a threshold for controlling the switch is chosen such that the signal/noise ratio is at least 3.

6. The glazing as claimed in claim 2, wherein the electrodes defining the sensor are extended over the support by conductors also formed in the conductive layer.

7. The glazing as claimed in claim 1, wherein the capacitive sensor and the capacitive switch are positioned on the internal face of the internal glass sheet.

8. The glazing as claimed in claim 1, additionally comprising an essentially transparent conductive shield, situated on one side of the support, which masks the electrodes from external influences located on the one side.

9. The glazing as claimed in claim 1, wherein a position of the electrodes in the glazing is shown by a presence of a diode carried by the support of the electrodes and supplied by conductors formed in the same layer in which the electrodes are formed.

10. The glazing as claimed in claim 1, wherein materials and thicknesses of the support and of the conductive layer are chosen so that their transmission in the region the visible wavelengths, according to the standard EN 410, is not less than 80%.

11. The glazing as claimed in claim 1 wherein the functional element is an element which modifies a light transmission of the glazing and consists of a film of SPD (suspended particles device) type.

12. The glazing as claimed in claim 1, wherein the functional element is an element which modifies a light transmission of the glazing and consists of a film of LC (liquid crystal) type.

13. The glazing as claimed in claim 1, wherein the functional element consists of an assembly of light-emitting diodes, which diodes are also carried by the support and supplied by the conductive layer.

14. The glazing as claimed in claim 13, wherein the conductive layer is a layer of thin conductive oxide (TCO).

15. The glazing as claimed in claim 14, wherein the conductive layer is a layer of indium oxide doped with tin (ITO).

16. The glazing as claimed in claim 1, wherein the support consists of a glass slide, the thickness of which is not greater than 0.8 mm.

17. The glazing as claimed in claim 1, wherein the support consists of a glass slide, the thickness of which is not greater than 0.5 mm.

18. The glazing as claimed in claim 1, wherein a capacitive switch is positioned on the internal face 4 of the internal glass sheet.

19. An automotive glazing comprising:
an external glass sheet and an internal glass sheet, each respectively comprising an external face and an internal face, joined by one or more thermoplastic interlayer sheets,
at least one electrically supplied functional assembly being inserted between the one or more thermoplastic interlayer sheets,
a capacitive sensor for controlling the supplying of the functional assembly via a unit for processing signals emitted by the sensor, the sensor also being positioned on a transparent support coated with a transparent conductive layer, the sensor being formed, in the transparent conductive layer, of a first region which corresponds to a capacitive electrode and a second region corresponding to a shielding electrode surrounding the first region, the first and the second regions separated by a distance A,
a capacitive switch placed at a distance B from the capacitive electrode, wherein a distance A between the capacitive electrode and the shielding electrode is equivalent to the distance B between the capacitive switch and the capacitive electrode, wherein a surface area of the electrodes of the sensor is at most 0.1 $dm^2$.

20. The glazing as claimed in claim 19, wherein the surface area of the electrodes of the sensor is at most 0.05 $dm^2$.

* * * * *